United States Patent [19]

Marshall et al.

[11] 4,397,985
[45] Aug. 9, 1983

[54] POLYESTER YARN FINISH COMPOSITION

[75] Inventors: Robert M. Marshall, Chester; Kimon C. Dardoufas, Richmond; Stanley D. Lazarus, Petersburg, all of Va.

[73] Assignee: Allied Corporation, Morris Township, Morris County, N.J.

[21] Appl. No.: 360,153

[22] Filed: Mar. 22, 1982

Related U.S. Application Data

[63] Continuation-in-part of Ser. No. 137,170, Apr. 4, 1980, abandoned.

[51] Int. Cl.³ .................. B32B 15/06; B32B 25/02
[52] U.S. Cl. .................. 524/837; 156/110 A; 156/110 C; 252/8.75; 252/8.9; 427/208.8; 427/387; 427/389.9; 428/391; 428/395; 528/21
[58] Field of Search .................. 528/21; 252/8.75, 8.9; 156/110 C, 110 A; 427/387, 389.9, 208.8; 428/391, 395; 524/837

[56] References Cited

U.S. PATENT DOCUMENTS

| | | | |
|---|---|---|---|
| 3,231,412 | 1/1966 | Pruitt et al. | 156/110 A |
| 3,418,160 | 12/1968 | Abashian | 156/110 A |
| 3,642,518 | 2/1972 | Miki et al. | 156/110 A |
| 3,672,977 | 6/1972 | Dardoufas | 156/110 A |
| 3,730,892 | 5/1973 | Marshall et al. | 252/8.75 |
| 3,903,332 | 9/1975 | Kelly et al. | 427/390 |
| 3,905,947 | 9/1975 | Cowell et al. | 156/110 A |
| 3,993,847 | 11/1976 | Kondo | 156/110 A |
| 3,997,496 | 12/1976 | Razzano | 528/21 |
| 4,054,634 | 10/1977 | Marshall et al. | 156/110 A |
| 4,076,668 | 2/1978 | Kaneda et al. | 156/110 A |
| 4,154,911 | 5/1979 | Bak et al. | 156/110 A |
| 4,207,071 | 6/1980 | Lipowitz et al. | 428/395 |
| 4,210,700 | 7/1980 | Marshall et al. | 156/110 A |
| 4,218,359 | 8/1980 | Marshall et al. | 524/794 |

FOREIGN PATENT DOCUMENTS

| | | | |
|---|---|---|---|
| 1024835 | 1/1978 | Canada | 156/110 A |
| 2314184 | 10/1973 | Fed. Rep. of Germany | 156/110 A |

OTHER PUBLICATIONS

Derwent Publications Ltd.'s Central Patent Index Country Alerting Bulletin, Section A, Week 1323, 7/18/79, J5-A, p. 5-Abstract of Japanese 54052188.

*Primary Examiner*—Ronald W. Griffin

[57] ABSTRACT

A fiber finish composition, a process for treating polyester yarn therewith and polyester yarn so treated are all disclosed. The fiber finish composition, which is preferably applied as an overfinish to the yarn subsequent to drawing of the yarn, comprises about 60 to 90 weight percent of water; about 0.3 to 10 weight percent of gammaglycidoxypropyltrimethoxysilane; about 0.05 to 4.0 weight percent of a catalyst selected from the group consisting of urea and a solution of a cobalt, stannous, iron, nickel, zinc, manganese or chromium salt of 2-ethylhexoic acid or lauric acid in a carrier which is miscible in water; and about 6.5 to 38.6 weight percent of a compatible noncontinuous phase. The catalyst, alternatively, may form 0.00025 to 0.8 weight percent of the composition when selected from the group consisting of cobalt, manganese, iron, nickel, chromium, tin and molybdenum salts of a mono- or polyfunctional organic acid wherein each acid function moiety has 4 to 30 carbon atoms; the catalyst in this instance is added to the nonaqueous portion of the overfinish prior to formation of the oil in water emulsion. The yarn is preferably used in reinforcing rubber, for example in records for the construction of pneumatic passenger tires or conveyor belts, and results in excellent adhesion of the cord to rubber.

54 Claims, No Drawings

POLYESTER YARN FINISH COMPOSITION

BACKGROUND OF THE INVENTION

This is a continuation-in-part of application Ser. No. 137,170, filed Apr. 4, 1980, now abandoned.

FIELD OF THE INVENTION

The present invention relates to fiber finish compositions, processes for treating polyester yarn therewith and polyester yarn so treated. More particularly, the present invention relates to fiber finish compositions for application to polyester, preferably polyethylene terephthalate, yarn after drawing of the yarn; the yarn is preferably used in reinforcing rubber, for example in cords for the construction of pneumatic passenger tires or conveyor belts, and results in excellent adhesion of the cord to rubber.

DESCRIPTION OF THE PRIOR ART

Polyester cord requires the application of an adhesive layer to obtain bonding to rubber. Two types of adhesive systems, a single dip and a double dip adhesive system, have been developed to meet this need. In the double dip system, polyester cords are treated with a first dip which is a dispersion of a phenol-blocked methylene bis-phenylene diisocyanate, an epoxy resin, wetting agents and water. The treated cord is cured, then treated with a second dip of resorcinol-formaldehyde latex and cured again. In the single dip system, an adhesive layer is applied to the polyester yarn in an overfinish subsequent to drawing of the yarn. The polyester yarn is then plied into cords which are treated with a resorcinol-formaldehyde latex dip and cured.

The present invention significantly improves fiber to rubber adhesion of cords treated with the single dip system, and of cords treated with the double dip system wherein the curing temperature and/or time following application of at least one of the dips has been reduced.

The closest prior art is believed to be U.S. Pat. Nos. 3,642,518 to Miki et al., 3,672,977 to Dardoufas, 3,730,892 to Marshall et al. and 4,054,634 to Marshall et al.

SUMMARY OF THE INVENTION

The present invention provides fiber finish compositions, processes for treating polyester yarn therewith and polyester yarn so treated.

One fiber finish composition comprises about 60 to 90 weight percent of water; about 0.3 to 10 weight percent of gamma-glycidoxypropyltrimethoxysilane; about 0.05 to 4.0 weight percent of a catalyst for the gamma-glycidoxypropyltrimethoxysilane selected from the group consisting of urea and a solution of a cobalt, stannous, iron, nickel, zinc, manganese or chromium salt of 2-ethylhexoic acid or lauric acid in a carrier which is miscible in water; and about 6.5 to 38.6 weight percent of a compatible noncontinuous phase. Another, more preferred fiber finish composition comprises about 60 to 90 weight percent of water; and the balance a nonaqueous portion comprising about 0.3 to 10 weight percent of the composition of a silane having the structural formula

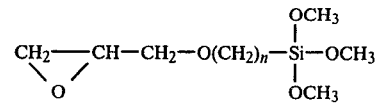

wherein n=2 to 5, preferably gamma-glycidoxypropyltrimethoxysilane; about 0.00025 to 0.8 weight percent of the composition of a catalyst for the silane selected from the group consisting of cobalt, manganese, iron, nickel, chromium, tin and molybdenum salts of a mono- or polyfunctional organic acid whherein each acid function moiety has 4 to 30 carbon atoms; and about 6.5 to 38.6 weight percent of the composition of a compatible noncontinuous phase. The compositions are applied to polyester yarn, preferably polyethylene terephthalate yarn, prepared by a process involving spinning and drawing steps as overfinishes after drawing the yarn.

The present invention also provides, in an aqueous overfinish composition comprising gamma-glycidoxypropyltrimethoxysilane for application to polyester yarn, the improvement which comprises an effective amount of a catalyst for the gamma-glycidoxypropyltrimethoxysilane selected from the group consisting of urea and a solution of a cobalt, stannous, iron, nickel, zinc, manganese or chromium salt of 2-ethylhexoic acid or lauric acid in a carrier which is miscible in water. Similarly, the present invention provides, in an aqueous overfinish composition comprising a silane having the structural formula

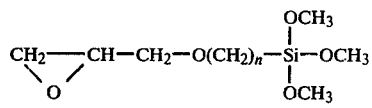

wherein n=2 to 5, for application to polyester yarn, the improvement which comprises an effective amount of a catalyst in the nonaqueous portion of the composition for the silane selected from the group consisting of cobalt, manganese, iron, nickel, chromium, tin and molybdenum salts of a mono- or polyfunctional organic acid wherein each acid function moiety has 4 to 30 carbon atoms. Preferred organic acids are stearic, oleic, lauric, ethylhexoic, naphthenic and behenic. Especially preferred catalysts hereunder are cobalt octoate, cobalt naphthenate and manganese naphthenate. It is preferred in the latter overfinish that the catalyst be added neat to the nonaqueous portion although any carrier, e.g., a heavy mineral oil, which does not cause separation of the nonaqueous portion is satisfactory for adding the catalyst. By heavy mineral oil is meant one having a viscosity of 300 to 10,000 centipoises, Saybolt Universal Seconds (SUS) at 100° F. (38° C.).

With respect to the embodiment with the solution of a cobalt, stannous, iron, nickel, zinc, manganese or chromium salt of 2-ethylhexoic aid or lauric acid in a carrier which is miscible in water, it is preferred that: the salt of the acid be cobalt octoate or stannous octoate, more preferably the former; the carrier be ethanol, isopropanol or a solution of water, isopropanol and a salt of sulfonated dialkyl succinic ester, most preferably the former; and the salt form from about 0.5 to 20 weight percent of the solution. In any event, the amount of catalyst in the overfinish may range from 0.00025 to 0.8 weight percent.

It is preferred that the yarn be treated with from about 1 to 7 weight percent based on the weight of the yarn of the overfinish composition and that about 0.4 to 0.6 weight percent based on the weight of the yarn, of overfinish oil, remains on the yarn after processing.

The compatible noncontinuous phase of the composition may include lubricants, emulsifiers, wetting agents, antistats, antioxidants, tints and other typical, active overfinish ingredients. The compatible noncontinuous phase of the composition preferably comprises about 50 to 70 weight percent of isohexadecyl stearate, about 3 to 9 weight percent of glycerol monooleate, about 2 to 8 weight percent of decaglycerol tetraoleate, about 5 to 12 weight percent of ethoxylated tall oil fatty acid, about 5 to 15 weight percent of sulfonated glycerol trioleate, and about 1 to 10 weight percent of ethoxylated alkyl amine.

The present invention also provides, in a process for the production of polyester yarn involving spinning and drawing steps, the improvement which comprises treating the yarn subsequent to the drawing step with the overfinish composition described previously. The yarn is then formed into cords which are treated with a conventional resorcinol-formaldehyde-latex containing composition and then cured.

Regular carboxyl yarn (defined below) can be cured at lower temperatures, e.g., less than 241° C. (465° F.) and preferably 149° C. (300° F.) or more with acceptable adhesion according to the present invention. Low carboxyl yarn (defined below) can be cured at normal cure temperatures, e.g., a least about 241° C. (465° F.), with acceptable adhesion according to the present invention.

Improved cord to rubber adhesion results from use of this invention at lower curing temperatures; in those instances where adhesion is already at an acceptable level, little improvement is ordinarily seen.

Low carboxyl polyester yarn is defined as having about 8 to 18 carboxyl end groups (meq/kg). Regular carboxyl polyester yarn is defined as having about 19 to 30 carboxyl end groups (meq/kg).

The Strip Adhesion Test utilized in Examples 1 through 42 is defined in U.S. Pat. No. 3,940,544 to Marshall et al., hereby incorporated by reference. However, adhesion results reported in Tables IV and V are obtained by averaging data derived by the defined test with data supplied by customers who will not divulge their test methods. For Examples 43 through 84, this test was modified to wind test cord at 40 ends per inch (rather than 20) to cover the entire rubber layer with cord; it is believed that this gives a more accurate measure of cord to rubber adhesion.

DESCRIPTION OF THE PREFERRED EMBODIMENT

In order to demonstrate the invention, the following examples are given. They are provided for illustrative purposes only and are not to be construed as limiting the scope of the invention, which is defined by the appended claims. Specifically, it is believed that there are other compatible noncontinuous phases which would perform as satisfactorily as the ones detailed. In these examples, parts and percentages are by weight unless specified otherwise.

Preferred spin finishes are selected from the group consisting of:

i. a composition comprising about 10 to 30 weight percent of isohexadecyl stearate; about 10 to 30 weight percent of refined coconut oil; about 2 to 10 weight percent of ethoxylated alkyl amine; about 5 to 25 weight percent of ethoxylated alkyl alcohol; about 5 to 20 weight percent of a salt of alkylarylsulfonate; about 1 to 8 weight percent of a solution of a salt of sulfonated dialkyl succinic ester, isopropanol and water; and about 10 to 60 weight percent of a low viscosity petroleum distillate;

ii. a composition comprising about 20 to 60 weight percent of isohexadecyl stearate; about 2 to 10 weight percent of ethoxylated alkyl amine; about 5 to 25 weight percent of ethoxylated alkyl alcohol; about 5 to 20 weight percent of a salt of alkylarylsulfonate; about 1 to 8 weight percent of a solution of a salt of sulfonated dialkyl succinic ester, isopropanol and water; and about 10 to 60 weight percent of a low viscosity petroleum distillate;

iii. a composition comprising about 20 to 60 weight percent of refined coconut oil; about 2 to 10 weight percent of ethoxylated alkyl amine; about 5 to 25 weight percent of ethoxylated alkyl alcohol; about 5 to 20 weight percent of a salt of alkylarylsulfonate; about 1 to 8 weight percent of a solution of a salt of sulfonated dialkyl succinic ester, isopropanol and water; and about 10 to 60 weight percent of a low viscosity petroleum distillate; and iv. a composition comprising about 20 to 60 weight percent of a blended $C_8$–$C_{10}$ fatty acid ester of pentaerythritol; about 5 to 25 weight percent of ethoxylated alkyl alcohol; about 5 to 20 weight percent of a salt of alkylarylsulfonate; about 2 to 10 weight percent of ethoxylated alkyl amine; about 1 to 8 weight percent of a solution of a salt of sulfonated dialkyl succinic ester in a solvent; and about 10 to 60 weight percent of a low viscosity petroleum distillate. It is preferred that the yarn be treated with from about 0.1 to 2.0 weight percent based on the weight of the yarn of the spin finish composition and that about 0.05 to 0.4 weight percent based on the weight of the yarn, of spin finish oil, remains on the yarn after high temperature processing.

The yarns of this invention can be processed by any spin draw process or spinning and separately drawing process available to the art and the patent and technical literature, using any suitable polyester.

The preferred polyesters are the linear terephthalate polyesters, i.e., polyesters of a glycol containing from 2 to 20 carbon atoms and a dicarboxylic acid component containing at least about 75 percent terephthalic acid. The remainder, if any, of the dicarboxylic acid component may be any suitable dicarboxylic acid such as sebacic acid, adipic acid, isophthalic acid, sulfonyl-4,4'-dibenzoic acid, or 2,8-di-benzofuran-dicarboxylic acid. The glycols may contain more than two carbon atoms in the chain, e.g., diethylene glycol, butylene glycol, decamethylene glycol and bis-1,4-(hydroxymethyl) cyclohexane. Examples of linear terephthalate polyesters which may be employed include poly(ethylene terephthalate), poly(butylene terephthalate), poly(ethylene terephthalate/5-chloroisophthalate) (85/15), poly(ethylene terephthalate/5-[sodium sulfo]isophthalate) (97/3), poly(cyclohexane-1,4-dimethylene terephthalate), and poly(cyclohexane-1,4-dimethylene terephthalate/hexahydroterephthalate) (75/25).

The phrase "low viscosity petroleum distillate" includes deodorized kerosene and mineral oil having a viscosity of about 38 to 40 SUS and a boiling point of about 265° C. (510° F.) to 327° C. (620° F.).

With respect to the overfinish composition of the present invention, it is believed that the water, the carrier (miscible in water) for the salt of a fatty acid, and a portion of the compatible noncontinuous phase (e.g., isohexadecyl stearate) evaporate between the steps of beaming and curing, and that further removal occurs during curing. With respect to the spin finishes, the low viscosity petroleum distillate, those portions of the wetting agent other than the salt of sulfonated dialkyl succinic ester, and some isohexadecyl stearate flash off during drawing and/or other high temperature processing. Reference to yarn having either or both of these finishes incorporated therewith is therefore intended to include yarn wherein the specified finish components have evaporated.

The dialkyl sulfosuccinates useful in this invention are the salts of dialkyl sulfosuccinates, especially the ammonium salt and the alkali metal, particularly sodium and potassium, salts of a dialkyl ester of sulfosuccinic acid; similarly for the salt of alkylarylsulfonate.

EXAMPLE 1 (DOUBLE DIP CONTROL)

For comparative testing, a polyethylene terephthalate yarn having 23 to 27 yarn carboxyls was prepared substantially in accordance with one procedure described in U.S. Pat. No. 3,672,977, hereby incorporated by reference, i.e., a 1300 denier, 192 filament yarn was prepared comprised of polyethylene terephthalate filaments treated with about 0.45 percent based on the weight of the yarn of a liquid spin finish identified as Spin Finish A in Table I. Drawing performance of the yarn was excellent. Finish oil on the fiber was 0.2 weight percent.

To this yarn a secondary finish, or overfinish, identified as Overfinish A of Table II, was applied at a 3.3 percent total wet pickup to achieve a total oil on yarn level of about 1.1 percent. This sample is the double dip control. The yarn was twisted into 3-ply cords having 8×8 twists per inch, and then treated with the Double Dip System set forth in Table VII utilizing the dip formulations of Table VI. Adhesion of these cords to rubber, a vital parameter in tire cord production, was measured according to the strip adhesion test. Results are recorded in Table IV.

EXAMPLES 2-6

The procedure of Example 1 was followed in Examples 2 through 6 utilizing the spin finishes and overfinishes designated in Table IV. In Examples 4 through 6, the spin finish oil on yarn after drawing was about 0.25 weight percent based on the weight of the yarn. Results of strip adhesion testing are shown in Table IV.

A comparison of Examples 1 through 6 shows the critical importance to adhesion of the presence of both the gamma-glycidoxypropyltrimethoxysilane and the 1 percent solution of cobalt octoate in ethanol in Overfinish C of the present invention in double dip systems. In those examples where gamma-glycidoxypropyltrimethoxysilane was a component of the overfinish, i.e., examples 2, 3, 5 and 6, about 0.12 percent based on the weight of the yarn of the gamma-glycidoxypropyltrimethxysilane was retained on the yarn.

EXAMPLE 7 (SINGLE DIP CONTROL)

For comparative testing, a polyethylene terephthalate yarn having 10 to 14 carboxyls was prepared in accordance with one procedure described in U.S. Pat. No. 3,672,977, i.e., a 1300 denier, 192 filament yarn was prepared comprised of polyethylene terephthalate filaments treated with about 0.45 percent based on the weight of the yarn of a liquid spin finish identified as Spin Finish A in Table I. Drawing performance of the yarn was excellent. Finish oil on the fiber was 0.2 weight percent.

To this yarn a secondary finish, or overfinish, identified as Overfinish B of Table II, was applied at a 3.3 percent total wet pickup to achieve a total oil on yarn level of about 1.1 percent and about 0.12 percent based on the weight of the yarn of gamma-glycidoxypropyltrimethoxysilane. This sample was the single dip control and was prepared in accordance with the teaching of U.S. Pat. No. 3,730,892, hereby incorporated by reference, except that the antioxidant, 4,4'-thiobis(6-tert-butyl-m-cresol), was omitted.

The yarn was twisted into two-ply cords with 9×9 twists per inch. Each cord was treated with the Resorcinol-Formaldehyde-Latex Dip of Table VI at 4.5 percent total solids pickup based on the weight of the cord utilizing Dip system Single-A of Table VII. The treated cords were subjected to the strip adhesion test, results of which are presented in Table IV.

EXAMPLES 8-25

The procedure of Example 7 was followed in Examples 8 through 25 utilizing the spin finishes and overfinishes designated in Table IV. The overfinishes of Examples 9 through 25 (see Table III) were identical to Overfinish C of Table II except that the catalysts listed in Table III were evaluated in place of the 1 percent solution of cobalt octoate in ethanol of Overfinish C. Results of adhesion testing are presented in Table IV.

A comparison of Examples 7 through 25 shows the critical importance to adhesion of the presence of both the gamma-glycidoxypropyltrimethoxysilane and either urea or a solution of either cobalt or stannous octoate in ethanol in the overfinish of the present invention for the single dip system. The adhesion ratings were especially excellent for Example 8.

It is expected that equally satisfactory adhesion ratings would result from utilizing as the catalyst a solution of iron, nickel, zinc, manganese or chromium salt of 2-ethylhexoic acid or lauric acid in a carrier which is miscible in water.

EXAMPLES 26 AND 27

For comparative testing, a polyethylene terephthalate yarn having 10 to 14 carboxyls was prepared in accordance with one procedure described in U.S. Pat. No. 3,672,977, i.e., a 1300 denier, 192 filament yarn was prepared comprised of polyethylene terephthalate filaments treated with about 0.45 percent based on the weight of the yarn of a liquid finish identified as Spin Finish A in Table I. Drawing performance of the yarn was excellent. Finish oil on the fiber was 0.2 weight percent.

In Example 26, the yarn was overfinished to a total oil on yarn level of 0.6 percent with an overfinish which comprised 6.5 weight percent of gamma-glycidoxypropyltrimethoxysilane, 80 weight percent of water, and 13.4 weight percent of Caplube 8369. Caplube 8369 is an overfinish proprietary to and obtainable from Capital City Products Company, Division of Stokely-Van Camp, Incorporated, P.O. Box 569, Columbus, Ohio 43216. In Example 27, the yarn was overfinished to a total oil on yarn level of 0.6 percent with an overfinish which comprised 6.5 weight percent of gammaglycidoxypropyltrimethoxysilane, 78.4 weight percent of water, 13.1 weight percent of Caplube 8369 and 2.0 weight percent of a one percent solution of cobalt octoate in ethanol. Each of the above yarns was twisted into a 3-ply cord having 8.8 twists per inch. The cords were treated with the Resorcinol-Formaldehyde-Latex Dip shown in Table VI utilizing the tensilizing conditions of the Dip System Single-B of Table VII.

The treated cords were subjected to the strip adhesion test with the following results:

|  | Pounds Pull | Visual Rating |
|---|---|---|
| Example 26 | 27 | 2.5 |
| Example 27 | 40.8 | 5.0 |

A comparison of Examples 26 and 27 shows the critical importance to adhesion of the presence of both gamma-glycidoxypropyltrimethoxysilane and a 1 percent solution of cobalt octoate in ethanol in the overfinish of the present invention. These examples also demonstrate that there are other compatible noncontinuous phases which can be used in the overfinish of the present invention.

EXAMPLES 28-38

In Examples 28, 29, 31, 32, 35 and 36, the procedure of Example 1 is followed utilizing the finishes and overfinishes specified in Table V. In Examples 30, 34 and 38, the procedure of Example 1 is followed, also utilizing the finishes and overfinishes specified in Table V, except that the overfinishes are applied at a 3.3 percent total wet pickup to achieve a total oil on yarn level of about 0.8 percent, and about 0.12 based on the weight of the yarn of gamma-glycidoxypropyltrimethoxysilane (for Examples 34 and 35). In Examples 33 and 37, the procedure of Example 1 is followed except that the overfinishes (see Table V) are applied at a 2.4 percent total wet pickup to achieve a total oil on yarn level of about 0.8 percent, and about 0.12 percent based on the weight of the yarn of gamma-glycidoxypropyltrimethoxysilane. Expected adhesion results are listed in Table V.

EXAMPLES 39-42

In Examples 39 through 42, the procedure of Example 7 is followed utilizing the spin finishes and overfinishes designated in Table V. The overfinishes of Examples 39-42 (see Table III) are identical to Overfinish C of Table II except that the catalysts listed in Table III are evaluated in place of the 1 percent solution of cobalt octoate in ethanol of Overfinish C. Expected adhesion results are presented in Table V.

EXAMPLES 43-45 (CONTROLS)

For comparative testing, a regular carboxyl polyethylene terephthalate yarn was prepared substantially in accordance with one procedure described in U.S. Pat. No. 3,672,977, i.e., a 1000 denier, 192 filament yarn was prepared comprised of polyethylene terephthalate filaments treated with a sufficient amount of Spin Finish A (Table I) to achieve a 0.2 weight percent oil on fiber. Subsequent to being drawn, the yarn had applied thereto a sufficient amount of Overfinish D' (Table II) to achieve a total oil on yarn level of 0.8 weight percent. The finish was prepared in accordance with the teaching of U.S. Pat. No. 3,730,892, except that the antioxidant, 4,4'-thiobis(6-tert-butyl-m-cresol), was omitted.

The yarn was twisted into 3-ply cords having 9×9 twists per inch, and then was treated with the Table VII Single-C, Single-D and Single-E Dip Systems in Examples 43-45, respectively, utilizing first an RFL dip like that of Table VI but non-ammoniated (about 20 to 21 weight percent solids) and passing through a first oven at 148° C. (300° F.) for 80 seconds. Results of strip adhesion testing are shown in Table VIII.

EXAMPLES 46-48

The procedure of Examples 43-45 was followed in Examples 46-48, respectively, utilizing Overfinish E' (Table II). The catalyst for the silane, cobalt octoate, was added to the other nonaqueous components of the overfinish, followed by agitation and the subsequent addition of the water. The catalyst could not be added neat to the oil in water emulsion; carrier miscible in water was required. Strip adhesion test results are presented in Table VIII.

A comparison of Examples 46-48 with Examples 43-45, respectively, shows the improvement in adhesion through use of the cobalt octoate catalyst in the overfinish. Note especially the significantly improved adhesion at lower treating temperatures for regular carboxyl yarn (Example 46).

EXAMPLES 49-51

The procedure of Examples 43-45 was followed in Examples 49-51, respectively, utilizing Overfinish G' (Table II). The catalyst for the silane, manganese naphthenate, was added as in Examples 46-48. Strip adhesion test results are presented in Table VIII.

A comparison of Examples 49-51 with Examples 43-45, respectively, shows the improvement in adhesion through use of the manganese naphthenate catalyst in the overfinish. Note especially the significantly improved adhesion at lower treating temperatures for regular carboxyl yarn (Example 49).

It is expected that equally satisfactory adhesion ratings would result from utilizing as the catalyst iron, nickel, chromium, tin and molybdenum salts of a mono- or polyfunctional organic acid wherein each acid function moiety has 4 to 30 carbon atoms, and also the cobalt salt of organic acids other than 2-ethylhexoic or manganese salt of organic acids other than naphthenic acid.

EXAMPLES 52-60

The procedures of Examples 43-51 were followed in Examples 52-60, respectively, utilizing a low carboxyl yarn. Results of strip adhesion testing are presented in Table VIII. Improved cord to rubber adhesion results at lower curing temperatures utilizing the overfinish of the present invention; compare Examples 55 and 58 with 52, and 56 and 59 with 53, respectively.

EXAMPLES 61-64 (CONTROLS)

The procedure of Example 43 was followed except the yarn was twisted into 5-ply cords having 1.75S twists per inch, and then was treated with the Table VII Single-F, Single-H, Single-D, and Single-E Dip Systems in Examples 61-64, respectively, and passed through a first oven at 99° C. (210° F.) for 180 seconds. Results of strip adhesion testing are shown in Table VIII.

EXAMPLES 65-72

The procedure of Examples 61-64 was followed in Examples 65-68, respectively, utilizing Overfinish E'

(Table II), and in Examples 69-72, respectively, utilizing Overfinish G'. As in Examples 46-51, the catalyst was added to the other nonaqueous components of the overfinish, followed by agitation and the subsequent addition of the water. Strip adhesion test results are presented in Table VIII.

EXAMPLES 73-76 (CONTROLS)

The procedure of Example 43 was followed except the yarn was twisted into 2-ply cords having 12×12 twists per inch, and then was treated with the Table VII Single-C, Single-H, Single-D, and Single-J Dip systems, respectively, in Examples 73-76. Strip adhesion test results are shown in Table VIII.

EXAMPLES 77-80

The procedure of Examples 73-76 was followed in Examples 77-80, respectively, utilizing Overfinish E' (Table II), where the catalyst was added to the other nonaqueous components of the overfinish as in Examples 46-48. Results of strip adhesion testing are shown in Table VIII.

EXAMPLES 81-82 (CONTROLS)

The procedure of Example 43 was followed except the yarn was twisted into 2-ply cords having 12×12 twists per inch, and then was treated with the Table VII Single-D and Single-E Dip Systems in Examples 81-82, respectively. Results of strip adhesion testing are presented in Table VIII.

EXAMPLES 83-84

The procedure of Examples 81-82 was followed in Examples 83-84, respectively, utilizing Overfinish F' (Table II), where the catalyst was added to the other nonaqueous components of the overfinish as in Examples 46-48. Results of strip adhesion testing are shown in Table VIII.

EXAMPLE 85

An attempt was made to add a 1 percent solution of cobalt octoate in ethanol, in an amount sufficient to product about 0.02 percent based on final contemplated weight of the overfinish, to the nonaqueous components of Overfinish D'. The nonaqueous portion separated immediately.

TABLE I

SPIN FINISH COMPOSITION (PERCENT BY WEIGHT)

| Components | A | B | C | D |
|---|---|---|---|---|
| Isohexadecyl stearate | 15 | — | 30 | — |
| Refined coconut oil | 15 | 30 | — | — |
| POE(4)* lauryl ether | 13 | 13 | 13 | 13 |
| Sodium salt of alkylarylsulfonate | 10 | 10 | 10 | 10 |
| POE(20)* tallow amine | 5 | 5 | 5 | 5 |
| Nekal WS-25** | 2 | 2 | 2 | — |
| Mineral oil | 40 | 40 | 40 | 40 |
| Blended C8-C10 fatty acid ester of pentaerythritol | — | — | — | 30 |
| Aerosol OT-S*** | — | — | — | 2 |

*Moles of ethylene oxide per mole of base material.
**GAF's trade name for solution consisting of 75 percent sodium dinonyl sulfosuccinate, 10 percent isopropanol, and 15 percent water.
***American Cyanamid's trade name for solution consisting of 70 percent sodium dioctyl sulfosuccinate and 30 percent petroleum distillate.

TABLE II

Overfinish Compositions
Finish Identity (Percent by Weight)

| Component | A | B | C | D | E | F |
|---|---|---|---|---|---|---|
| Isohexadecyl stearate | 19.5 | 18.8 | 18.5 | 18.5 | 18.2 | 13 |
| Glycerol monooleate | 1.8 | 1.7 | 1.7 | 1.7 | 1.7 | 1.2 |
| Decaglycerol tetraoleate | 1.5 | 1.4 | 1.4 | 1.4 | 1.4 | 1.0 |
| POE(15)* tall oil fatty acid | 2.4 | 2.3 | 2.3 | 2.3 | 2.2 | 1.6 |
| Sulfonated glycerol trioleate | 3.6 | 3.5 | 3.4 | 3.4 | 3.3 | 2.4 |
| POE(20)* tallow amine | 1.2 | 1.2 | 1.1 | 1.2 | 1.1 | 0.8 |
| Gamma-glycidoxypropyl-trimethoxysilane | — | 3.5 | 3.4 | 5.1 | 5.0 | — |
| Water | 70.0 | 67.6 | 66.3 | 66.4 | 65.2 | 80.0 |
| 1% solution cobalt octoate in ethanol | — | — | 1.9 | — | 1.9 | — |
| Cobalt octoate | — | — | — | — | — | — |
| Cobalt neodecanoate (63%) in heavy mineral oil carrier (37%) | — | — | — | — | — | — |
| Manganese naphthenate | — | — | — | — | — | — |

| Component | G | H | D' | E' | F' | G' |
|---|---|---|---|---|---|---|
| Isohexadecyl stearate | 12.5 | 12.3 | 17.8 | 17.8 | 17.8 | 17.8 |
| Glycerol monooleate | 1.2 | 1.1 | 1.7 | 1.7 | 1.7 | 1.7 |
| Decaglycerol tetraoleate | 1.0 | 0.9 | 2.3 | 2.3 | 2.3 | 2.3 |
| POE(15)* tall oil fatty acid | 1.5 | 1.5 | 2.2 | 2.2 | 2.2 | 2.2 |
| Sulfonated glycerol trioleate | 2.3 | 2.3 | 3.3 | 3.3 | 3.3 | 3.3 |
| POE(20)* tallow amine | 0.8 | 0.8 | 1.2 | 1.2 | 1.2 | 1.2 |
| Gamma-glycidoxypropyl-trimethoxysilane | 3.5 | 3.4 | 5.1 | 5.1 | 5.1 | 5.1 |
| Water | 77.2 | 75.8 | 66.4 | 66.4 | 66.4 | 66.4 |
| 1% solution cobalt octoate in ethanol | — | 1.9 | — | — | — | — |
| Cobalt octoate | — | — | — | ** | — | — |
| Cobalt neodecanoate in heavy mineral oil carrier (37%) | — | — | — | — | *** | — |
| Manganese naphthenate | — | — | — | — | — | ** |

*Moles of ethylene oxide per mole of base material.
**Approximately 0.02 weight percent of these components.
***Approximately 0.03 weight percent to achieve 0.02 weight percent cobalt neodecanoate. Available from Mooney Chemicals, Inc., 2301 Scranton Road, Cleveland, Ohio, under the name Catalyst 401.

TABLE III

Overfinish Compositions

| Component | Finish Identity |
|---|---|
| 1% Solution cobalt octoate in isopropanol | I |
| 4% Solution cobalt octoate in Nekal WS-25* | J |
| 1% Solution stannous octoate in ethanol | K |
| 1% Solution stannous octoate in isopropanol | L |
| 4% Solution stannous octoate in Nekal WS-25* | M |
| Hexamethylenetetramine | N |
| Versamid 140 (General Mills) Reactive Polyamide Resin | O |
| Triethanolamine | P |
| Tetrahydrofurfuryl acrylate | Q |
| Dibutyltin laurate | R |
| Boron trifluoride | S |
| Polyphosphoric acid | T |
| Urea | U |
| Tetrabutyl phosphonium bromide | V |
| Caprolactam | W |
| Didecylsuccinic anhydride | X |
| Tris hydroxyethyl isocyanurate | Y |
| Stannic chloride | Z |

TABLE III-continued

Overfinish Compositions

| Component | Finish Identity |
|---|---|
| Tetraethylene tetramine | A' |
| Zinc fluoroborate | B' |
| Tricresyl phosphate | C' |

*GAF's trade name for solution consisting of 75 percent sodium dinonyl sulfosuccinate, 10 percent isopropanol, and 15 percent water.

TABLE IV

Adhesion Results

| Example | Spin Finish | Over-finish | Dip System | Adhesion Pounds Pull | Visual Rating |
|---|---|---|---|---|---|
| 1 Double dip control | A | A | Double | 48 | 4.5 |
| 2 Comparative | A | B | Double | 47 | 4.4 |
| 3 | A | C | Double | 47 | 4.8 |
| 4 Comparative | D | A | Double | 45 | 4.4 |
| 5 Comparative | D | B | Double | 47 | 4.7 |
| 6 | D | C | Double | 50 | 5.0 |
| 7 Single dip control | A | B | Single | 35 | 2.0 |
| 8 | A | C | Single | 49 | 4.5 |
| 9 | A | K | Single | 38 | 4.0 |
| 10 Comparative | A | N | Single | 37 | 2.0 |
| 11 Comparative | A | O | Single | 34 | 2.0 |
| 12 Comparative | A | P | Single | 34 | 1.5 |
| 13 Comparative | A | Q | Single | 33 | 2.0 |
| 14 Comparative | A | R | Single | 35 | 2.3 |
| 15 Comparative | A | S | Single | 35 | 1.6 |
| 16 Comparative | A | T | Single | 38 | 1.7 |
| 17 Comparative | A | U | Single | 36 | 4.0 |
| 18 Comparative | A | V | Single | 35 | 2.3 |
| 19 Comparative | A | W | Single | 39 | 2.8 |
| 20 Comparative | A | X | Single | 39 | 3.0 |
| 21 Comparative | A | Y | Single | 37 | 2.5 |
| 22 Comparative | A | Z | Single | 34 | 1.5 |
| 23 Comparative | A | A' | Single | 42 | 2.0 |
| 24 Comparative | A | B' | Single | 34 | 1.7 |
| 25 Comparative | A | C' | Single | 35 | 2.7 |

TABLE V

Expected Adhesion Results

| Example | Spin Finish | Over-finish | Dip System | Adhesion Pounds Pull | Visual Rating |
|---|---|---|---|---|---|
| 28 Double dip control | B | A | Double | 48 | 4.5 |
| 29 Double dip control | C | A | Double | 48 | 4.5 |
| 30 Double dip control | A | F | Double | 48 | 4.5 |
| 31 Comparative | B | B | Double | 47 | 4.4 |
| 32 Comparative | C | B | Double | 47 | 4.4 |
| 33 Comparative | A | D | Double | 47 | 4.4 |
| 34 Comparative | A | G | Double | 47 | 4.4 |
| 35 | B | C | Double | 47 | 4.8 |
| 36 | C | C | Double | 47 | 4.8 |
| 37 | A | E | Double | 47 | 4.8 |
| 38 | A | H | Double | 47 | 4.8 |
| 39 | A | I | Single | 49 | 4.5 |
| 40 | A | J | Single | 49 | 4.5 |
| 41 | A | L | Single | 49 | 4.5 |
| 42 | A | M | Single | 49 | 4.5 |

TABLE VI

DIP FORMULATIONS

| Blocked Diisocyante Dip (BDI) | % | Resorcinol-Formaldehyde-Latex Dip (RFL) | % |
|---|---|---|---|
| Hylene* MP | 5.3 | Vinyl pyridine latex | 20.8 |
| Epon** 812 | 2.0 | Resorcinol | 2.24 |
| Aerosol OT*** | 0.18 | Ammonium hydroxide | 1.96 |
| Gum tragacanth | 0.058 | Formaldehyde | 1.16 |
| Water | 92.5 | Sodium hydroxide | 0.061 |
| | 100.0 | | 73.8 |
| | | | 100.0 |

Note:
These percentages are based on theoretical 100% concentrations of reagents. Allowance should be made in practice for the strengths commonly met, e.g., ammonium hydroxide 28%.

*E. I. duPont deNemours, Inc.'s trade name for bisphenol adduct of methylene bis(4-phenyl isocyante).
**Shell Chemical Company's trade name for glycerin epichlorohydrin resin.
***American Cyanamid's trade name for sodium dioctyl sulfosuccinate.

TABLE VII

TREATING CONDITIONS

| Dip System | Dip | Temperature (°C.) | (°F.) | Exposure (seconds) |
|---|---|---|---|---|
| Double (no stretch) | BDI, 0.5–1.0% | 148 | 300 | 20 |
| | | 243 | 470 | 50 |
| | RFL, 4.0–5.0% | 148 | 300 | 20 |
| | | 204 | 400 | 50 |
| Single-A (1% stretch) | RFL, 4.0–5.0% | 237 | 460 | 30 |
| Single-B (1% stretch) | RFL, 4.0–5.0% | 251 | 485 | 45 |
| Single-C (1% stretch) | RFL, 4.0–5.0% | 149 | 300 | 60 |
| Single-D (1% stretch) | RFL, 4.0–5.0% | 204 | 400 | 60 |
| Single-E (1% stretch) | RFL, 4.0–5.0% | 241 | 465 | 60 |
| Single-F (1% stretch) | RFL, 4.0–5.0% | 154 | 310 | 60 |
| Single-G (1% stretch) | RFL, 4.0–5.0% | 163 | 325 | 60 |
| Single-H (1% stretch) | RFL, 4.0–5.0% | 177 | 350 | 60 |
| Single-I (1% stretch) | RFL, 4.0–5.0% | 191 | 375 | 60 |
| Single-J (1% stretch) | RFL, 4.0–5.0% | 232 | 450 | 60 |

TABLE VIII

Adhesion Results

| Example | Spin Finish | Over-finish | Dip System | Adhesion Pounds Pull | Visual Rating |
|---|---|---|---|---|---|
| 43 Control | A | D' | Single-C | 36 | 3.0 |
| 44 Control | A | D' | Single-D | 42 | 4.2 |
| 45 Control | A | D' | Single-E | 55 | 5.0 |
| 46 | A | E' | Single-C | 42 | 3.5 |
| 47 | A | E' | Single-D | 45 | 4.2 |
| 48 | A | E' | Single-E | 52 | 5.0 |
| 49 | A | G' | Single-C | 41 | 3.5 |
| 50 | A | G' | Single-D | 49 | 4.0 |
| 51 | A | G' | Single-E | 54 | 4.6 |
| 52 Control | A | D' | Single-C | 21 | 1.0 |
| 53 Control | A | D' | Single-D | 28 | 2.0 |
| 54 Control | A | D' | Single-E | 53 | 4.2 |
| 55 | A | E' | Single-C | 26 | 2.0 |
| 56 | A | E' | Single-D | 30 | 2.5 |
| 57 | A | E' | Single-E | 43 | 4.2 |
| 58 | A | G' | Single-C | 28 | 1.0 |
| 59 | A | G' | Single-D | 33 | 2.5 |
| 60 | A | G' | Single-E | 47 | 4.2 |
| 61 Control | A | D' | Single-F | 35 | 2-3 |
| 62 Control | A | D' | Single-H | 49 | 3-4 |
| 63 Control | A | D' | Single-D | 54 | 3-4 |
| 64 Control | A | D' | Single-E | 61 | 4.8 |
| 65 | A | E' | Single-F | 37 | 2.0 |
| 66 | A | E' | Single-H | 39 | 2-3 |
| 67 | A | E' | Single-D | 50 | 3.0 |
| 68 | A | E' | Single-E | 70 | 4.8 |
| 69 | A | G' | Single-F | 41 | 2.0 |
| 70 | A | G' | Single-H | 39 | 3.0 |
| 71 | A | G' | Single-D | 52 | 3-4 |
| 72 | A | G' | Single-E | 68 | 5.0 |
| 73 Control | A | D' | Single-C | 64 | 4.8 |
| 74 Control | A | D' | Single-H | 68 | 4.8 |
| 75 Control | A | D' | Single-D | 74 | 4.8 |
| 76 Control | A | D' | Single-J | 78 | 5.0 |
| 77 | A | E' | Single-C | 66 | 5.0 |
| 78 | A | E' | Single-H | 68 | 4.8 |
| 79 | A | E' | Single-D | 80 | 4.9 |
| 80 | A | E' | Single-J | 76 | 5.0 |
| 81 Control | A | D' | Single-D | 60 | 5 |

TABLE VIII-continued

| | Adhesion Results | | | | |
|---|---|---|---|---|---|
| | | | | Adhesion | |
| Example | Spin Finish | Over- finish | Dip System | Pounds Pull | Visual Rating |
| 82 Control | A | D' | Single-E | 66 | 4.8 |
| 83 | A | F' | Single-D | 66 | 4.8 |
| 84 | A | F' | Single-E | 63 | 4.6 |

What is claimed is:

1. In an aqueous overfinish composition comprising gamma-glycidoxypropyltrimethoxysilane for application to polyester yarn, the improvement which comprises an effective amount of a catalyst for the gamma-glycidoxypropyltrimethoxysilane selected from the group consisting of urea and a solution of a stannous, iron, nickel, zinc, manganese or chromium salt of 2-ethylhexoic acid or lauric acid in a carrier which is miscible in water.

2. The composition of claim 1 wherein the catalyst is stannous octoate.

3. The composition of claim 1 wherein the catalyst is urea.

4. The composition of claim 1 wherein the carrier is ethanol.

5. The composition of claim 1 wherein the carrier is isopropanol.

6. The composition of claim 1 wherein the carrier is a solution of water, isopropanol and a salt of sulfonated dialkyl succinic ester.

7. The composition of claim 1 wherein the catalyst is a solution of stannous octoate in ethanol.

8. A polyester yarn having incorporated therewith the composition of claim 1.

9. An overfinish composition for polyester yarn, said composition comprising:
a. about 60 to 90 weight percent of water;
b. about 0.3 to 1 weight percent of gamma-glycidoxypropyltrimethoxysilane;
c. about 0.05 to 4.0 weight percent of a catalyst selected from the group consisting of urea and a solution of a stannous, iron, nickel, zinc, manganese or chromium salt of 2-ethylhexoic acid or lauric acid in a carrier which is miscible in water; and
d. about 6.5 to 38.6 weight percent of a compatible noncontinuous phase.

10. A polyester yarn having incorporated therewith the composition of claim 9.

11. The composition of claim 9 wherein the catalyst is stannous octoate.

12. The composition of claim 9 wherein the catalyst is urea.

13. The composition of claim 9 wherein the carrier is ethanol.

14. The composition of claim 9 wherein the carrier is isopropanol.

15. The composition of claim 9 wherein the carrier is a solution of water, isopropanol and a salt of sulfonated dialkyl succinic ester.

16. The composition of claim 9 wherein the catalyst is a solution of stannous octoate in ethanol.

17. The composition of claim 9 wherein the salt forms from 0.5 to 20 weight percent of the solution.

18. The composition of claim 9 wherein said compatible noncontinuous phase comprises about 50 to 70 weight percent of isohexadecyl stearate, about 3 to 9 weight percent of glycerol monooleate, about 2 to 8 weight percent of decaglycerol tetraoleate, about 5 to 12 weight percent of ethoxylated tall oil fatty acid, about 5 to 15 weight percent of sulfonated glycerol trioleate, and about 1 to 10 weight percent of ethoxylated alkyl amine.

19. In a process for the production of polyester yarn involving spinning and drawing steps, the improvement which comprises: treating the yarn subsequent to the drawing step with an overfinish composition which comprises:
a. about 60 to 90 weight percent water;
b. about 0.3 to 10 weight percent of gamma-glycidoxypropyltrimethoxysilane;
c. about 0.05 to 4.0 weight percent of a catalyst selected from the group consisting of urea and a solution of a stannous, iron, nickel, zinc, manganese or chromium salt of 2-ethylhexoic acid or lauric acid in a carrier which is miscible in water; and
d. about 6.5 to 38.6 weight percent of a compatible noncontinuous phase.

20. The process of claim 19 wherein the yarn is treated with a sufficient amount of said overfinish composition that about 0.4 to 0.6 weight percent based on the weight of the yarn, of overfinish oil, remains on the yarn after processing.

21. The process of claim 19 wherein the improvement further comprises the step of treating the yarn during the spinning step with a spin finish composition selected from the group consisting of:
a. a composition comprising about 10 to 30 weight percent of isohexadecyl stearate; about 20 to 30 weight percent of refined coconut oil; about 2 to 20 weight percent of ethoxylated alkyl amine; about 5 to 25 weight percent of ethoxylated alkyl alcohol; about 5 to 20 weight percent of a salt of alkylarylsulfonate; about 1 to 8 weight percent of a solution of a salt of sulfonated dialkyl succinic ester, isopropanol and water; and about 10 to 60 weight percent of a low viscosity petroleum distillate.
b. a composition comprising about 20 to 60 weight percent of isohexadecyl stearate; about 2 to 10 weight percent of ethoxylated alkyl amine; about 5 to 25 weight percent of ethoxylated alkyl alcohol; about 5 to 20 weight percent of a salt of alkylarylsulfonate; about 1 to 8 weight percent of a solution of a salt of sulfonated dialkyl succinic ester, isopropanol and water; and about 10 to 60 weight percent of a low viscosity petroleum distillate;
c. a composition comprising about 20 to 60 weight percent of refined coconut oil; about 2 to 10 weight percent of ethoxylated alkyl amine; about 5 to 25 weight percent of ethoxylated alkyl alcohol; about 5 to 20 weight percent of a salt of alkylarylsulfonate; about 1 to 8 weight percent of a solution of a salt of sulfonated dialkyl succinic ester, isopropanol and water; about 10 to 60 weight percent of a low viscosity petroleum distillate; and
d. a composition comprising about 20 to 60 weight percent of a blended $C_8$-$C_{10}$ fatty acid ester of pentaerythritol; about 5 to 25 weight percent of ethoxylated alkyl alcohol; about 5 to 20 weight percent of a salt of alkylarylsulfonate; about 2 to 10 weight percent of ethoxylated alkylamine; about 1 to 8 weight percent of a solution of a salt of sulfonated dialkyl succinic ester in a solvent; and about 10 to 60 weight percent of a low vicosity petroleum distillate.

22. The process of claim 21 wherein the spin finish composition comprises about 20 to 60 weight percent of a blended C₈–C₁₀ fatty acid ester of pentaerythritol; about 5 to 25 weight percent of ethoxylated alkyl alcohol; about 5 to 20 weight percent of a salt of alkylarylsulfonate; about 2 to 10 weight percent of ethoxylated alkylamine; about 1 to 8 weight percent of a solution of a salt of sulfonated dialkyl succinic ester in a solvent; and about 10 to 60 weight percent of a low viscosity petroleum distillate.

23. The process of claim 21 wherein the yarn is treated with a sufficient amount of said spin finish composition that about 0.05 to 0.4 weight percent based on the weight of the yarn, of spin finish oil, remains on the yarn after processing.

24. The process of claim 19 wherein the catalyst is stannous octoate.

25. The process of claim 19 wherein the catalyst is urea.

26. The process of claim 19 wherein the carrier is ethanol.

27. The process of claim 19 wherein the carrier is isopropanol.

28. The process of claim 19 wherein the carrier is a solution of water, isopropanol and a salt of sulfonated dialkyl succinic ester.

29. The process of claim 19 wherein the catalyst is a solution of stannous octoate in ethanol.

30. The process of claim 19 wherein the salt forms from 0.5 to 20 weight percent of the solution.

31. The process of claim 19 wherein said compatible noncontinuous phase comprises abut 50 to 70 weight percent of isohexadecyl stearate, about 3 to 9 weight percent of glycerol monoolete, about 2 to 8 weight percent of decaglycerol tetraoleate, about 5 to 12 weight percent of ethoxylated tall oil fatty acid, about 5 to 15 weight percent of sulfonated glycerol trioleate, and about 1 to 10 weight percent of ethoxylated alkyl amine.

32. In an aqueous overfinish composition comprising a silane having the structural formula

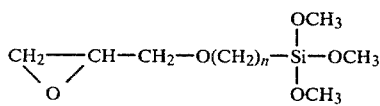

wherein n=2 to 5, for application to polyester yarn, the improvement which comprises an effective amount of a catalyst in the nonaqueous portion of the composition for the silane selected from the group consisting of manganese, iron, nickel, chromium, tin and molybdenum salts of a mono- or polyfunctional organic acid wherein each acid function moiety has 4 to 30 carbon atoms; cobalt naphthenate; and cobalt neodecanoate.

33. The composition of claim 32 wherein the catalyst is cobalt naphthenate.

34. The composition of claim 32 wherein the catalyst is manganese naphthenate.

35. A polyester yarn having incorporated therewith the composition of claim 32.

36. The composition of claim 32 wherein the silane is gamma-glycidoxypropyltrimethoxysilane.

37. The composition of claim 32 wherein the catalyst is in a solution of a heavy mineral oil carrier.

38. The composition of claim 37 wherein the catalyst is cobalt neodecanoate in heavy mineral oil.

39. An overfinish composition for polyester yarn, said composition comprising:

a. about 60 to 90 weight percent of water; and
b. the balance a nonaqueous portion comprising:
 1. about 0.3 to 10 weight percent of the composition of a silane having the structural formula

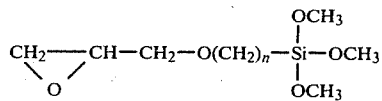

wherein n=2 to 5;
 2. about 0.00025 to 0.8 weight percent of the composition of a catalyst for the silane selected from the group consisting of manganese, iron, nickel, chromium, tin and molybdenum salts of a mono- or polyfunctional organic acid wherein each acid function moiety has 4 to 30 carbon atoms; cobalt naphthenate; and cobalt neodecanoate; and
 3. about 6.5 to 38.6 weight percent of the composition of a compatible noncontinuous phase.

40. The composition of claim 39 wherein the catalyst is cobalt naphthenate.

41. The composition of claim 39 wherein the catalyst is manganese naphthenate.

42. A polyester yarn having incorporated therewith the composition of claim 39.

43. The composition of claim 39 wherein the silane is gamma-glycidoxypropyltrimethoxysilane.

44. The composition of claim 39 wherein the catalyst is in a solution of a heavy mineral oil carrier.

45. The composition of claim 44 wherein the catalyst is cobalt neodecanoate in heavy mineral oil.

46. In a process for the production of polyester yarn involving spinning and drawing steps, the improvement which comprises: treating the yarn subsequent to the drawing step with an overfinish composition which comprises:

a. about 60 to 90 weight percent water; and
b. the balance a nonaqueous portion comprising:
 1. about 0.3 to 10 weight percent of the composition of a silane having the structural formula

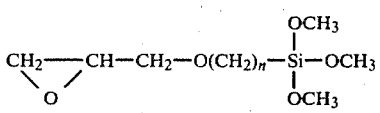

wherein n=2 to 5;
 2. about 0.00025 to 0.8 weight percent of the composition of a catalyst for the silane selected from the group consisting of manganese, iron, nickel, chromium, tin and molybdenum salts of a mono- or polyfunctional organic acid wherein each acid function moiety has 4 to 30 carbon atoms; cobalt naphthenate; and cobalt neodecanoate; and
 3. about 6.5 to 38.6 weight percent of the composition of a compatible noncontinuous phase.

47. The process of claim 46 wherein the catalyst is cobalt naphthenate.

48. The process of claim 46 wherein the catalyst is manganese naphthenate.

49. The process of claim 46 wherein the silane is gamma-glycidoxypropyltrimethoxysilane.

50. The process of claim 46 wherein the catalyst is in a solution of a heavy mineral oil carrier.

51. The process of claim 50 wherein the catalyst is cobalt neodecanoate in heavy mineral oil.

52. The process of claim 46 comprising the additional steps of forming the yarn into cord, treating the cord with a composition comprising resorcinol-formaldehydelatex and curing the yarn.

53. The process of claim 52 wherein the yarn is a regular carboxyl yarn and wherein the yarn is cured at a temperature of less than 241° C. (465° F.).

54. The process of claim 53 wherein the curing temperature is at least 149° C. (300° F.).

* * * * *